(Model.)
A. V. WHITEMAN.
FRUIT JAR.
No. 320,107.  Patented June 16, 1885.
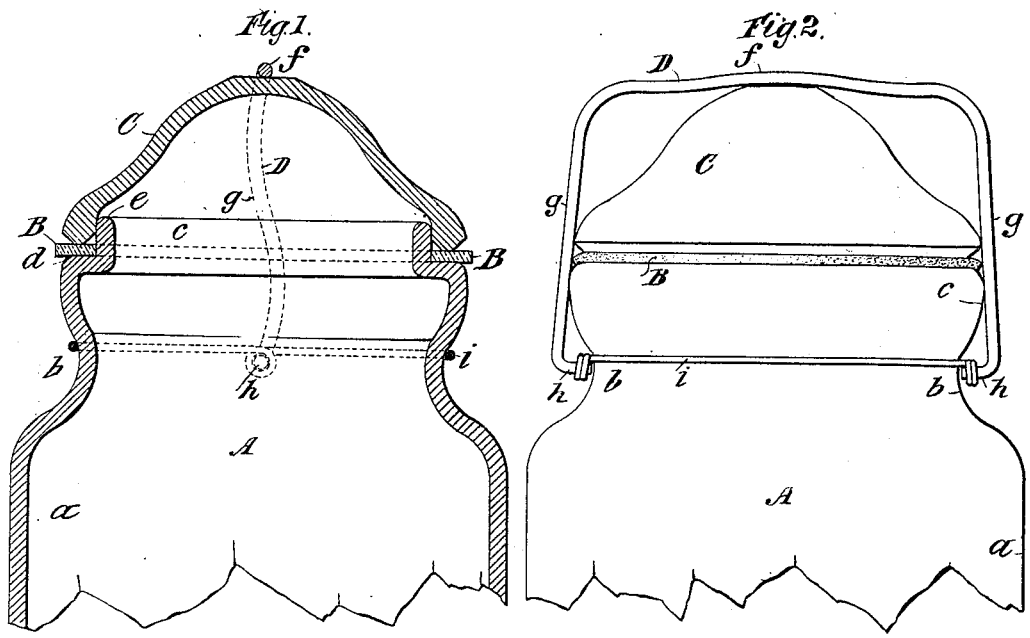
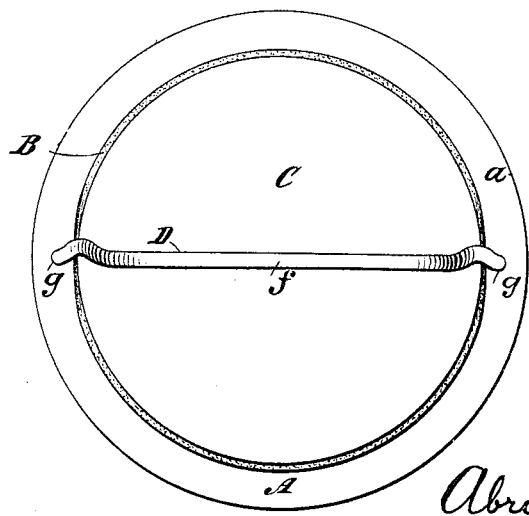
Witnesses:
Geo. H. Botts.
Edward C. Roche
Inventor:
Abram V. Whiteman,
by his attorneys,
Gifford & Brown
N. PETERS, Photo-Lithographer, Washington, D. C.

UNITED STATES PATENT OFFICE.

ABRAM V. WHITEMAN, OF NEW YORK, N. Y.

FRUIT-JAR.

SPECIFICATION forming part of Letters Patent No. 320,107, dated June 16, 1885.

Application filed January 27, 1885. (Model.)

*To all whom it may concern:*

Be it known that I, ABRAM V. WHITEMAN, of New York, in the county and State of New York, have invented a certain new and useful Improvement in Jars for Containing Fruit, Preserves, and the Like, of which the following is a specification.

I will describe a jar embodying my improvement, and then point out the improvement in claims.

In jars used for containing fruit, preserves, and the like it is desirable to have the covers entirely unconnected with the jars; hence I do not connect the cover of my jar with the bail or strap which is employed for securing it. The jar will be generally used by women and others having little ability for operating intricate mechanical contrivances, wherefore it is desirable to provide for placing the cover in any position upon the jar and securing it with the bail or strap. I therefore make the cover externally convex near its upper portion, so that the bail or strap may be swung over it while the latter is in any position upon the jar. It is also desirable in this form of jar that the bail, when in position on the cover, should be quite firmly held, in order that an accidental blow shall not move the bail off from the cover and so leave the cover unsecured. For this reason I have deemed it expedient to so form my bail that when it is in position to secure the cover in place its side portions, or one of them, will bear against the jar or cover, or against a packing inserted between the jar and cover or all said parts, and be held by friction, so as to aid in preventing the accidental displacement of the bail.

In the accompanying drawings, Figure 1 is a vertical section of the upper portion of a jar and appurtenances embodying my improvement. Fig. 2 is a side view of the same taken in a plane at right angles to that in which Fig. 1 is taken, and Fig. 3 is a top view of the same.

Similar letters of reference designate corresponding parts in all the figures.

A designates a jar, which may be made of glass, earthenware, or other appropriate material and of any desirable shape. In the present example of my improvement it is intended to have a cylindric body, $a$, a contracted upper portion or neck, $b$, and a mouth portion, $c$, made somewhat larger diametrically than the neck. The upper edge of the mouth portion is shown as provided with a rabbet, $d$, an upwardly-extending lip, $e$, being located at the inner side of the rabbet. In the rabbet $d$ is fitted a packing, which may consist of a ring of india-rubber or analogous material, B. The lip $e$ will preferably project slightly above the packing B.

C designates a cover for the jar. It preferably will be made of the same material as the jar, but it may be made of any other suitable material. It has an approximately bell-shaped exterior, or, in other words, it is convexed at the top and bottom portions, and has a concaved intermediate portion. As here shown, it has an interior similarly shaped; but the latter feature is not essential; indeed, it may be solid. Preferably the lower edge of the cover will be V-shaped in the cross-section, or will be provided with a rib which is V-shaped in the cross section, in order that it may indent itself into the packing B to make a tight joint. This cover is unconnected with the jar, and hence it may be entirely removed to facilitate washing. I deem it advisable to somewhat flatten the top of the cover and provide with a smooth surface, as thereby the bearing-surface for the bail is increased. It will be observed that the top portion of the cover describes a radius which is shorter than that which the bail describes when being moved onto and off from the cover.

D designates a bail or strap having a central bar-like portion, $f$, and two arm-like portions, $g$, extending at angles therefrom, and having the ends bent toward each other to form journals $h$. These journals $h$ are supported in bearings on the exterior of the jar, so that the bail may be swung up above the jar or down below the mouth of the same. The bar-like portion $f$ will, when the bail or strap is raised and the cover is in place, extend across the cover. It will be observed that the arm-like portions $g$ are, when the bail is in position over the cover, tightly pressed against the sides of the mouth portion $c$ of the jar A, and also against the lower exterior surface of the cover C. I may also, if desired, use a rubber ring of such size that the bail when in this position will encounter its outer edge. By this means friction is exerted upon the bail to hold it in position over the cover. I prefer to give to the arms $g$ a slight inward incline, so that they will operate with a resilient pressure upon the side of the mouth-piece and cover, or, in other words, in the direction of the diameter of the jar. The arms $g$ are only in contact with the sides of the mouth-piece and cover when the bail is in position over the top portion of the cover. The exterior of the mouth-piece, the lower portion of the cover, and the packing, singly or combined, constitute a friction-stop for the bail.

As here shown, the bearings for the journals $h$ consist of loops formed in a wire, $i$, wrapped around the neck $b$ of the jar and having its ends united by twisting them together or otherwise. The arm-like portions $g$ of the bail or strap D are made resilient between the journals $h$ and the bar-like portion $f$. In the present example of my improvement I provide for this resilience by making the arm-like portion of ogee shape. The resilience of the arm-like portion causes the bar-like portion to press tightly on the cover when raised over it and hold the cover tightly in place.

It will be observed that the bail or strap is unconnected with the cover. Owing to the bell-shaped form of the cover the bail in being moved onto the cover will not come in contact therewith until it has reached the convex portion thereof near the top. Less force is required, therefore, to adjust the bail into and out of position over the cover than would be necessary were the exterior of the cover of uniform convexity, as the bail is not in contact with the cover for so great a distance. The top portion of the cover with which the bail is in contact when over the cover is uniformly convexed in every direction. It is therefore immaterial in what position, circumferentially, it is placed upon the jar. After the jar has been filled the cover is applied to it so that it will rest upon the packing B and overlap the lip $e$. Then the bail will be swung upward. As the latter is swung upward, its bar-like portion $f$ will ride up over the top portion of the cover, the arm-like portions $g$ being extended longitudinally to allow of this. When the bar-like portion has been adjusted to the proper position upon the cover, it will be held on the cover by the arm-like portions with a force corresponding to their tendency to contract to their normal position. To release the cover it is only necessary to slide off the bail or strap-like portion, whereupon the cover may be lifted off.

The arm-like portions of the bail need not bear upon the jar cover and packing, but may act on any one of these parts, and it will generally suffice if only one of the arms has such an impingement.

What I claim as my invention, and desire to secure by Letters Patent, is—

1. The combination, with a jar, of a cover therefor having an approximately bell-shaped exterior and being flattened upon the top, and a bail journaled in bearings upon the jar and adapted to secure the cover to the jar, substantially as specified.

2. The combination, with a jar, of a bail pivoted thereon and a cover for the jar unconnected to the bail, and having a bell-shaped exterior provided with a smooth top surface, the top portion of the cover describing a radius which is shorter than that which the bail describes when being moved onto and off from the cover, substantially as described, whereby the bail will be in contact with the cover and mouth-piece of the jar only when the bail is over the top portion of the cover.

A. V. WHITEMAN.

Witnesses:
T. J. KEANE,
E. T. ROCHE.